United States Patent [19]
Prasad

[11] Patent Number: 5,425,801
[45] Date of Patent: Jun. 20, 1995

[54] MEMBRANE NITROGEN WITH TEMPERATURE TRACKING

[75] Inventor: Ravi Prasad, East Amherst, N.Y.

[73] Assignee: Praxair Technology, Inc., Danbury, Conn.

[21] Appl. No.: 170,883

[22] Filed: Dec. 21, 1993

[51] Int. Cl.⁶ .............................................. B01D 53/22
[52] U.S. Cl. ........................................ 95/15; 95/17; 95/18; 95/22; 95/45; 95/54
[58] Field of Search ................ 95/15, 17, 18, 22, 23, 95/45-54; 96/8, 10

[56] References Cited

U.S. PATENT DOCUMENTS

| | | |
|---|---|---|
| Re. 33,678 | 9/1991 | Campbell et al. .............. 95/52 X |
| 3,930,813 | 1/1976 | Gessner ............................ 95/54 |
| 3,930,814 | 1/1976 | Gessner ......................... 95/54 X |
| 4,397,661 | 8/1983 | King et al. ........................... 96/8 |
| 4,421,529 | 12/1983 | Revak et al. ...................... 95/54 |
| 4,781,907 | 11/1988 | McNeill ......................... 95/51 X |
| 4,806,132 | 2/1989 | Campbell ...................... 95/23 X |
| 4,857,082 | 8/1989 | DiMartino, Sr. et al. ...... 95/53 X |
| 4,881,953 | 11/1989 | Prasad et al. ................... 95/54 X |
| 4,894,068 | 1/1990 | Rice ................................. 95/51 |
| 5,053,058 | 10/1991 | Mitariten ...................... 95/51 X |
| 5,077,029 | 12/1991 | Schaub .......................... 423/351 |
| 5,102,432 | 4/1992 | Prasad ............................. 95/54 |
| 5,118,327 | 6/1992 | Nelson et al. ................. 95/22 X |
| 5,226,931 | 7/1993 | Combier .......................... 95/45 |
| 5,266,101 | 11/1993 | Barbe et al. ...................... 95/23 |
| 5,281,253 | 1/1994 | Thompson ........................ 95/22 |
| 5,284,506 | 2/1994 | Barbe ............................... 95/23 |
| 5,290,341 | 3/1994 | Barbe ............................... 95/54 |
| 5,302,189 | 4/1994 | Barbe et al. ...................... 95/54 |

*Primary Examiner*—Robert Spitzer
*Attorney, Agent, or Firm*—Alvin H. Fritschler

[57] ABSTRACT

Advanced membrane compositions having high permeability characteristics, and optimal operating temperatures above ambient during only a portion of the year, are operated with a controlled reduction in operating feed air pressure under rising ambient temperature conditions. The overall efficiency of the air separation process is enhanced, and power requirements are significantly reduced.

20 Claims, 8 Drawing Sheets

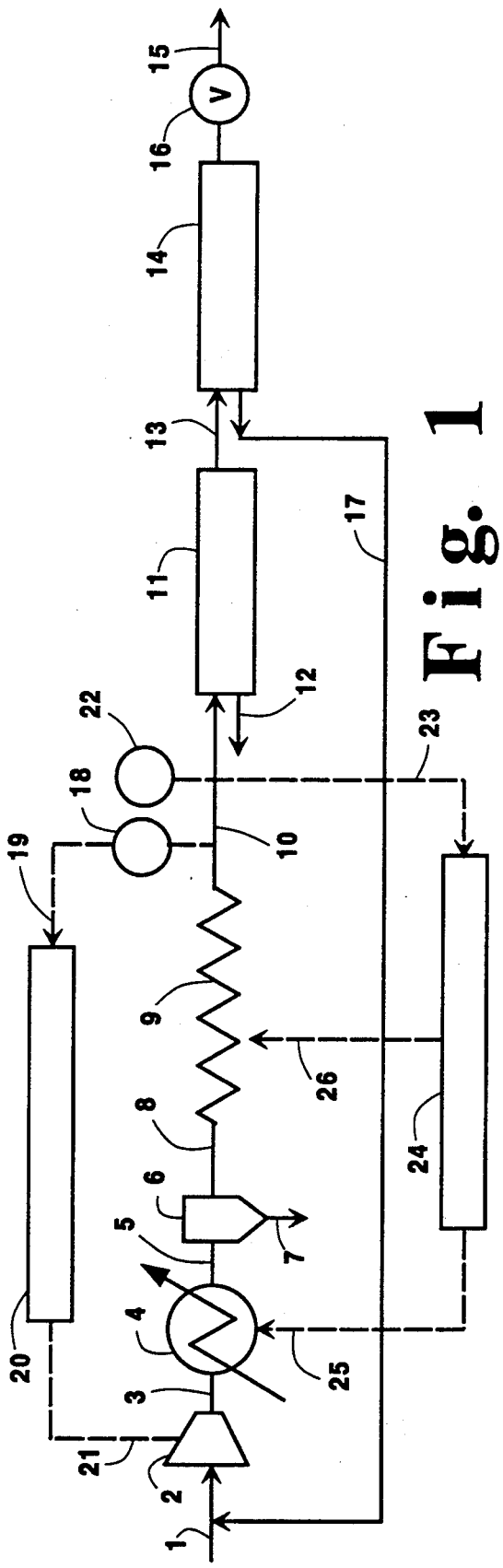
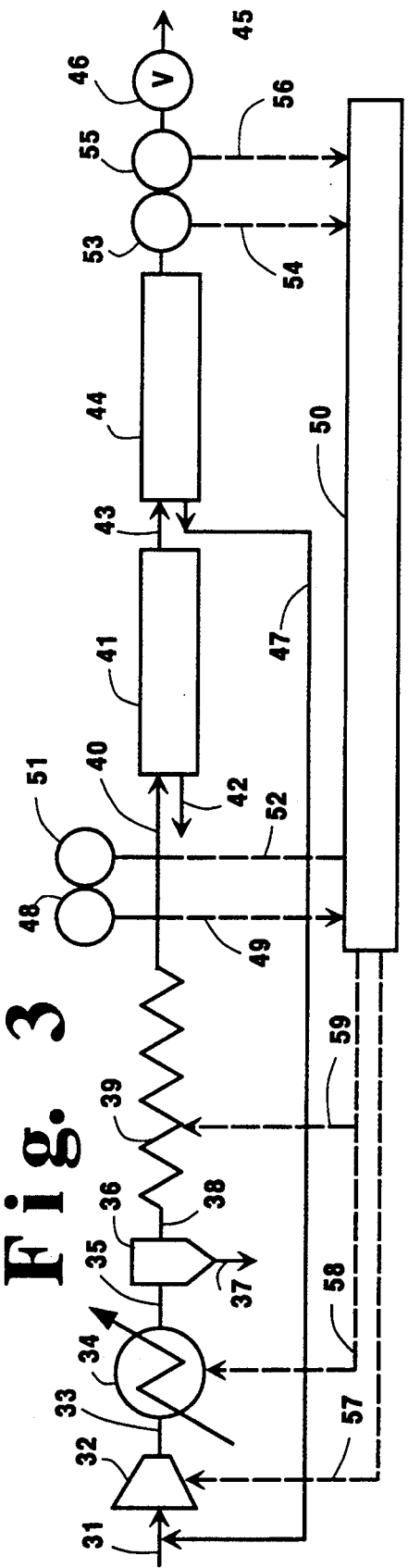

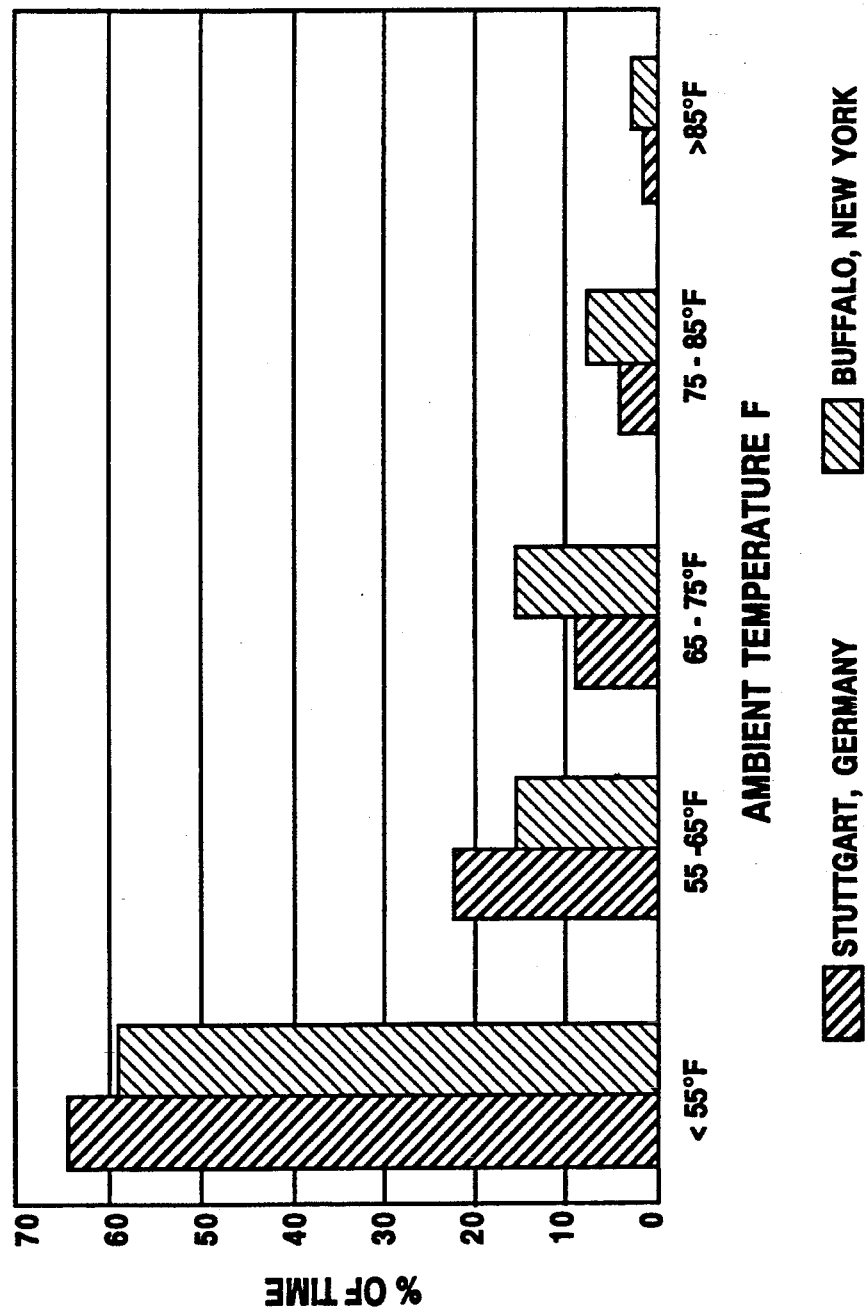

RELATIVE POWER VS. PURITY (STUTTGART)
T-TRAK PROCESS VS. STD. PROCESS

MEMBRANE NITROGEN WITH TEMPERATURE TRACKING

BACKGROUND OF THE INVENTION

1. Field of the Invention

This invention relates to the use of membranes for the recovery of nitrogen from air. More particularly, it relates to the operation of such membranes under variable temperature conditions.

2. Description of the Prior Art

Recent developments relating to permeable membranes have served to significantly reduce the cost of on-site systems for the production of relatively low purity, small tonnage nitrogen. The inherent simplicity of permeable membrane systems provides a strong incentive for the development of such systems to satisfy the requirements of a wide variety of commercial operations. The availability of hollow fiber membranes and membrane modules has enhanced the development of simple processes and systems for the production of product nitrogen and oxygen from air.

In the use of membranes for air separation, feed air is compressed and passed along the outside (inside) of a hollow fiber membrane bundle, with oxygen preferentially permeating through the surface of the membrane and with nitrogen being preferentially retained as a non-permeate or retentate stream on the feed side of the membrane. As it progresses through the membrane, the retentate stream becomes richer in nitrogen, so that the retentate is withdrawn from the discharge end of the module, on the feed side thereof, as a nitrogen-rich product.

The efficiency of membrane processes for air separation depends on the properties of the membrane material employed and on the parameters of the operating process. Two membrane material properties are of particular significance, namely the permeability/thickness ratio for oxygen, $P_o/t$, and the selectivity, or separation factor, $\alpha$, which is the ratio of the permeability of oxygen to that of nitrogen. The membrane process efficiency is enhanced when both of these factors are increased. Both factors are temperature-dependent. In general, the value of ($P_o/t$) increases with increasing temperature, while the value of $\alpha$ decreases as the temperature is increased. For fixed values of pressure and other operating variables, there is thus an optimum operating temperature. The range of properties available from many early hollow-fiber membrane materials was such that the optimum operating temperature was above ambient temperature. It is relatively easy to attain and conduct membrane air separation operations at this above ambient temperature, as by utilizing some or all of the heat of compression of the feed air or by modest heating of the feed stream. For consistent operation, membrane materials have been designed to operate typically at a fixed feed temperature generally from about 90° F. to about 140° F., and independent of the ambient temperature conditions. Less sophisticated membrane systems and processes operate with no feed temperature control. In this case, the operating temperature is determined solely by the existing temperature conditions and such systems and process are commonly limited to indoor use.

Improvements in materials and in the manufacture of hollow-fiber membranes have led to the development of advanced membrane materials, in addition to materials previously known, having high inherent values of $P_o/t$, with optimum operating temperatures that are below ambient temperature. To accommodate this circumstance, the feed temperature can be reduced somewhat by the use of compressor aftercoolers. When temperature reduction by this means has been exhausted, more expensive means of refrigeration are required to maintain the membrane feed stream at the low optimum operating temperature, particularly when the ambient temperature is high. The use of external means of refrigeration will be understood, however, to erode some or all of the advantages of operating at the optimum low temperature of the membrane system. As a result, membrane process technology typically does not take advantage of the lower temperatures that may be optimum for improved operation of advanced hollow-fiber membranes. Most membrane plants continue to operate with feed gas temperatures well above the ambient temperature and accept the inefficiencies resulting from such operation above the low optimum operating temperature for the advanced membrane materials employed.

There is a genuine need in the art for further developments to enable newer, advanced membrane materials having higher inherent $P_o/t$ values and optimum temperatures below ambient to be operated effectively without the need for external refrigeration. Such developments need to provide an economically feasible means for utilizing the advanced membranes in practical, commercial operations over the course of varying ambient temperature conditions.

It is an object of the invention, therefore, to provide a process for air separation that enables the properties of advanced, higher permeability membranes having below ambient optimum operating temperatures to be effectively utilized under varying ambient temperature conditions.

It is another object of the invention to provide an improved process for the use of advanced, high permeability membranes without the use of external refrigeration to achieve the low optimum operating temperatures thereof in times of high ambient temperature conditions.

With these and other objects in mind, the invention is hereinafter described in detail, the novel features thereof being particularly pointed out in the appended claims.

SUMMARY OF THE INVENTION

By tracking the ambient temperature during the course of membrane air separation operations, improved membranes having optimal operating temperatures below ambient can be operated with a controlled reduction in the feed air pressure upon increase in operating temperature due to a rise in ambient temperature. By such adjustments in pressure in response to ambient temperature changes, the overall efficiency of the membrane air separation operation is enhanced, while, in preferred embodiments, the utilization of the available surface area of the membrane is enhanced.

BRIEF DESCRIPTION OF THE DRAWINGS

The invention is hereinafter described in detail with reference to the accompanying drawings in which:

FIG. 1 is a schematic flow diagram illustrating a prior art system for the operation of a two stage membrane nitrogen process under constant temperature and pressure conditions;

FIG. 2 is a plot of the annual temperature variation for Stuttgart, Germany and Buffalo, N.Y., U.S.A.;

FIG. 3 is a schematic flow diagram illustrating a system for the practice of the temperature tracking process of the invention in a two stage membrane nitrogen process;

DETAILED DESCRIPTION OF THE INVENTION

Figure 4:
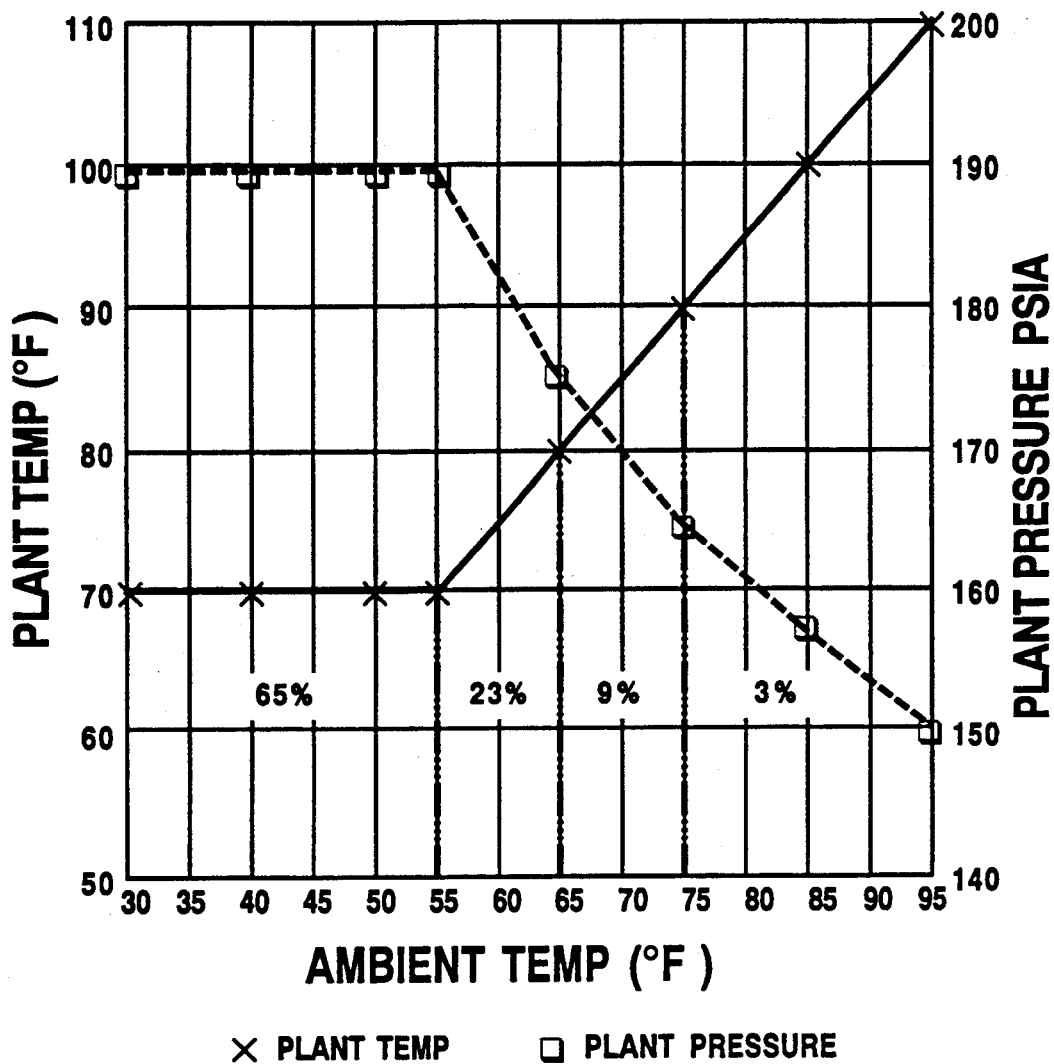
FIG. 4 is a plot of membrane plant temperature and pressure vs. ambient temperature in the practice of the invention for the production of 99% product nitrogen.

The objects of the invention are accomplished by novel processing operations that take advantage of the variations in the ambient temperature that exist at most plant-site locations. Many plant sites are in the temperate zone, or at relatively high latitudes, where the ambient temperature is below the optimum membrane operating temperature throughout much of the year. During such periods of cool ambient temperature, the membrane feed temperature can be maintained appropriately low, i.e. at its optimum isothermal temperature level, by conventional operation of the compressor aftercooler and heat addition, if required. During those times when the ambient temperature is relatively high, and conventional refrigeration means are insufficient to enable the membrane to operate at its optimum operating temperature, the feed gas temperature is allowed to rise, but the pressure is simultaneously decreased to compensate for the temperature rise while maintaining all of the available membrane surface area in gas separation service. Thus, the process is no longer operated at constant super-ambient temperature and at a fixed pressure ratio across the membrane from the feed to the permeate side thereof. Instead, increases in the operating temperature are "tracked" by a controlled reduction in the upper operating process pressure. By the use of a process computer/controller, appropriate adjustments are conveniently made to the feed temperature and pressure.

The overall efficiency of the process of the invention, when averaged throughout the year in the operation of advanced, high permeability membranes that operate at optimal temperatures below ambient temperature, is found superior to processes that operate at a constant super-ambient temperature, as shown by a decrease in the mean power factor of the membrane gas separation operation. Such lower mean power factor results in lower overall costs for the desired air separation operation. Thus, the invention takes advantage of the lower optimum operating temperatures available from advanced hollow-fiber membranes, without incurring the expense of external refrigeration. While the membrane separation process efficiency may be somewhat less than that of a process that operates constantly at a low optimum operating temperature, refrigeration costs are absent, and a very efficient overall process is achieved.

The advantages of the invention pertain to most plant-site locations in the temperate zone and at high latitudes. These advantages are further enhanced in applicable locations, such as Northern Europe, where power costs are relatively high.

It will be seen, therefore, that the invention pertains to membrane air separation processes, primarily those for the production of nitrogen product gas, which operate in two separate temperature-dependent regimes. In one regime, when the ambient temperature is sufficiently low, i.e, below the optimum operating temperature of the membrane system, the membrane feed temperature is maintained at a constant predetermined value that is close to the optimum operating temperature for the air separation process. Such conditions, in which cool ambient temperatures typically below about 70° F.–90° F. prevail, are encountered in temperate locations about ⅔ of an operating year, with higher ambient temperatures above this level being generally encountered during about ⅓ of said operating year. In other regions, the cool ambient temperature conditions will prevail at least about ½ of the operating year, with the ambient temperature rising to above said optimum operating temperature during the remainder of the year. The invention can also be employed in other regions where such cool ambient temperatures prevail during some other portion of the year, e.g., during less than half or even during as low as about 10% of the operating year. When the ambient temperature is too high for maintaining said optimum operating temperature, i.e., when cooling by means of the conventional aftercooler is insufficient, the second regime is entered. In this latter regime, the membrane feed temperature is allowed to rise above the optimum operating temperature, which increases the permeability of the membrane. Under this circumstance, the same desired product purity and flow can then be attained at a lower feed air pressure, thus reducing compressor power while achieving full utilization of the membrane surface area available. The pressure is controlled in a predetermined manner dependent on the temperature and may be automatically controlled by a process computer/controller so as to maintain a constant product purity, as conveniently determined by on-stream analysis of the retentate, i.e., by measuring the residual oxygen concentration of the retentate. It should be noted that, as a result of the lower selectivity of the membrane at the operating temperatures above the optimum operating temperature of the membrane, which feed air is allowed to reach, the power required to produce the same product purity and flow at temperatures above the optimum operating temperature would be expected to increase. In the practice of the invention, it has been found, however, that the divergent effects of an increase in permeability and a decrease in selectivity, actually result in a significant overall reduction in the power requirements of the membrane air separation process running isothermally and at constant pressure at a super-ambient operating temperature.

As a result, the invention advantageously involves temperature tracking at operating temperatures above the optimum operating temperature of the membrane, with a corresponding reduction in high operating pressures, so that a desirable reduction in power requirements is achieved in the temperature regime above the optimum operating temperature. When averaged over the course of a year, the Power Factors for the temperature tracking process of the invention are lower than those of the standard process for membrane air separation operations in the temperate zones at above the optimum operating temperature of high permeability, advanced membranes for which the invention is particularly suited.

In addition to the benefit of lower power, the invention has the additional advantage of allowing the feed air or other feed gas to be always superheated as it passes to the air or other gas separation membrane, contrary to conventional isothermal operation, e.g., at 100° F. As the membrane operating temperature tracks ambient temperature conditions, the reheater will always add a small amount of heat to the feed air or other feed gas stream, e.g., at least about 5° F. The feed air or other feed gas will thus be unsaturated, i.e., superheated, and will enter the membrane system having a relative humidity of less than 100%, typically below 90%. This is a significant added benefit of the invention since it serves to preclude undesired condensation from occurring in the membrane system.

Alternatively, some of the advantages of dual-region operation can be retained even when the feed pressure control cannot track the temperature variations over the entire range, due to limitations pertaining to the compression equipment. For instance, as the feed gas pressure is decreased with increased ambient temperature conditions, an operating condition with low efficiency with respect to the compressor at the plant site can be reached. A more efficient operation can then be achieved at somewhat higher feed pressure levels. In such cases, either the product purity or the product flow will tend to exceed specifications. Some of the permeator modules can be shut off in such cases to keep the compressor operating within efficient limits without excess product flow.

Current membrane processes for the production of nitrogen from feed air commonly employ one, two or three permeator stages, connected in series. Each stage is comprised of several permeator modules connected in parallel. The modules are packed with hollow fiber substrates supporting the thin skin portion of membrane material in asymmetric membrane structures, or the thin layer of deposited membrane material in composite membrane structures, that provide the air separation characteristics of the membrane. In a typical two-stage membrane system for air separation, the feed gas is compressed in a feed compressor, cooled in the compressor aftercooler, passed through a knockout vessel for the removal of condensed moisture, heated to the desired operating temperature, and passed to the feed side of each membrane stage in series. Product nitrogen is recovered as the non-permeate gas withdrawn from the second stage. The permeate stream from the second stage is recycled for passage to the feed air compressor with additional quantities of feed air, while the first stage permeate, rich in oxygen, is discharged to waste. With conventional membrane materials commonly used heretofore in membrane air separation systems, the optimum operating temperature for the air separation process is from about 90° F. to about 140° F. The compressed feed gas stream, i.e., feed air and any recycled gas, is generally above the ambient temperature, due to the heat of compression, and is usually saturated with moisture. The stream is passed through an aftercooler unit, which cools the gas and condenses most of the water vapor therefrom for removal in a conventional downstream knockout trap. The feed gas stream then passes through a reheater unit to bring the feed air to the desired operating temperature, i.e., at or about the optimum operating temperature of the membrane. It will be appreciated that the operation of the aftercooler and reheater units will depend on the prevailing temperature of the ambient feed air.

Those skilled in the art will appreciate that a variety of techniques for process control are known and commercially available. Current membrane air separation processes typically operate at a constant temperature and a constant pressure, except under turndown conditions. Such a system is shown in FIG. 1 of the drawing wherein inlet line 1 is used to pass feed air to feed air compressor 2, with compressed air passing therefrom in line 3 to aftercooler unit 4, in line 5 to knockout trap 6 from which condensed moisture is removed through line 7, and then in line 8 to heater 9 before passage in line 10 to the membrane air separation system. In the illustrated embodiment, a two stage membrane system is shown, with the feed air in line 10 being passed to first stage membrane 11. Permeate gas rich in the more permeable oxygen component of the feed air is removed from first stage membrane 11 through line 12 for discharge as a waste product of the operation. The less permeable nitrogen component of the feed air is removed from first stage membrane 11 on the non-permeate side thereof for passage in line 13 to second stage membrane 14. Product nitrogen is recovered from said second stage membrane 14 through product line 15 containing valve 16. Permeate gas containing significant amounts of nitrogen therein is withdrawn from said second stage membrane 14 through line 17 for recycle to line 1 for passage, with additional quantities of feed air, to feed air compressor 2.

Appropriate sensors are used to measure the temperature and pressure of the feed air stream. Thus, pressure sensor 18 is used to measure the feed air pressure, conveniently in line 10, and to transmit an input pressure signal 19 to a conventional pressure control unit 20, which is adapted to control feed air compressor 2 by means of output signal 21. Similarly, temperature sensor 22 is used to measure the feed air temperature, conveniently in said line 10, and to transmit an input temperature signal 23 to a conventional temperature control unit 24, which is adapted to adjust aftercooler unit 4, by means of output temperature signal 25, and/or to adjust reheater 9, by means of output temperature signal 26, so as to maintain the feed air temperature constant at the predetermined optimum operating temperature of the membrane system.

Most commercial membrane plants are located in temperate climates where the ambient temperature is typically well below the current operating temperature range of from about 90° F. to about 140° F., the typical operating temperature of the conventional membranes presently used in commercial practice. For example, FIG. 2 shows the annual temperature variation for Stuttgart, Germany and Buffalo, N.Y., U.S.A. As will be seen for these cities, the ambient air must be heated to attain the desired operating temperature of said conventional membranes. In commercial practice, this is easily accomplished by controlling the aftercooler and reheater units as illustrated in FIG. 1.

As the membrane technology has advanced, the permeability, i.e. the $P_o/t$ values, of membranes has increased. In particular, the effective thickness of practical membranes, that is, the portion of a membrane structure that determines its separation characteristics, has increasingly been reduced. The effect of a reduction in membrane thickness is shown in The Table below, where various properties and factors are shown for different operating temperatures. The membrane material employed is the hexafluoro aromatic polyamide, "6FDA-DAF" the properties of which have, been determined and reported by Tao-Han Kim and W. J. Koros, J. Mem. Sci. (1989) pp 43–56, as follows:

Separation Factor Alpha $(O_2/N_2) = 6.25$ at 35° C.
Permeability, $P_o = 5.1$ Barrers at 35° C.
Activation Energies: $E_o = 2.30$ Kcal/Mole K
$E_n = 3.49$ Kcal/Mole K The Area Factor is the membrane area required per unit of product flow, and the Power Factor is the relative total power consumed. The Area and Power Factors have been determined for a single stage membrane air separation process operating with a high feed air pressure of 150 psig and a low permeate side pressure of 15 psia. The hollow fibers employed in said membrane are utilized with a bore-side feed, following a countercurrent flow model and based upon complete radial mixing on both the permeate and the feed sides of the membrane. A two stage compressor with an adiabatic efficiency of 80% is used as a basis for power calculations. The tabulated Cost Function is a weighed combination of the Area Factor and the Power Factor as defined by:

Cost Function = 5× Area Factor + 1.5× Power Factor

This relationship is based on a capitalized cost of power of $1,500/kw, which is typical for many locations in the United States of America and elsewhere.

TABLE

| Temp °F. | Alpha α | $P_o$ Barrers | Power Factor | t = 500 Å | | t = 1000 Å | |
|---|---|---|---|---|---|---|---|
| | | | | Area Factor | Cost Funct. | Area Factor | Cost Funct |
| 100 | 6.14 | 5.25 | 8.4 | 0.56 | 15.4 | 1.12 | 18.20 |
| 90 | 6.36 | 4.91 | 8.22 | 0.59 | 15.3 | 1.18 | 18.23 |
| 80 | 6.60 | 4.59 | 8.04 | 0.63 | 15.2 | 1.26 | 18.36 |
| 70 | 6.85 | 4.27 | 7.87 | 0.66 | 15.1 | 1.32 | 18.41 |
| 60 | 7.13 | 3.96 | 7.71 | 0.71 | 15.1 | 1.42 | 18.67 |
| 50 | 7.42 | 3.46 | 7.56 | 0.77 | 15.2 | 1.54 | 19.04 |

The Table shows that the permeability, $P_o$, of a membrane increases with temperature, while the selectivity or separation factor, i.e. Alpha ($\alpha$), decreases with temperature. The computed Power Factor will be seen to increase with the temperature at which a membrane air separation operation is carried out, while the Area Factor decreases. In this regard, the Area Factor is strongly influenced by the effective membrane thickness. Halving the separation layer thickness, i.e. from 1,000Å to 500Å, thus serves to cut the Area Factor in half. It will be understood that the most desirable process is one having the lowest Cost Function. For a membrane thickness of 1,000Å, the lowest value of the Cost Function, in the Table above, is at or above the highest tabulated temperature, 100° F. For a membrane thickness of 500Å, the Cost Function, as shown in the Table, is reduced and exhibits a shallow minimum of between about 60° F. and 70° F. This is the optimum operating temperature for the thinner membrane referenced in the Table.

The conventional process control system as shown in FIG. 1 could be used to operate the membrane air separation process at 70° F. in practical commercial operations only when the ambient temperature is sufficiently low so that said desired operating temperature can be obtained without the need for external refrigeration. The lowest practical feed temperature is typically at least 5° F. to 15° F. above the ambient temperature. It will be seen from FIG. 2 of the drawings that the temperature in Buffalo or Stuttgart is 15° F. below 70° F. for approximately 60% of the time over the course of a year. During the remainder of the time, the ambient temperature is higher than 70° F., and the feed air temperature cannot be maintained at 70° F. by the conventional process control means of FIG. 1.

The process of the invention, hereinafter referred to as the "T-Trak" process, operates in two regimes to address the problem of variable ambient temperatures and the properties of advanced membrane materials as discussed above. In one regime, i.e. when the ambient temperature is sufficiently low, the process is operated isothermally at or near the optimum operating temperature of the membrane, e.g. 70° F., for the 500Å membrane of the Table. When, at particular times of the year, the ambient temperature is too high for such isothermal operation, the process is operated pursuant to the second regime, wherein the feed temperature is allowed to rise and assume a value typically approximately 5° F. to 15° F. higher than the prevailing ambient temperature.

In the practice of the illustrative embodiment of the invention, the high feed air pressure level is decreased as the temperature of the feed air rises, in response to increases in ambient temperature conditions, so as to assume a predetermined temperature, conveniently approximately 15° F. higher than the prevailing ambient temperature. The desired pressure of the feed air stream passing to the membrane system is that which maintains the desired product purity (or, if a lower product purity can be tolerated, maintains the desired product flow rate at a specified level). To achieve the desired lower feed air pressure in the practice of the invention, a suitable process computer/controller is employed. Such a process computer/controller utilizes the capabilities of modern process control technology available in the art, but not heretofore applied to the particular membrane operating problem addressed by the invention as herein disclosed and claimed. A convenient embodiment of the process control system as employed for purposes of the T-Trak Process of the invention is shown in FIG. 3 of the drawings. Line 31 is used to pass feed air to air compressor 32, from which compressed air is passed in line 33 to aftercooler unit 34, and in line 35 to knockout unit 36, from which condensed water is removed through line 37. Feed air then passes from knockout unit 36 in line 38 to heater unit 39, from which heated feed air is passed in line 40 to first stage membrane 41 of an illustrated two-stage membrane system. Permeate gas is discharged to waste from said first stage membrane 41 through line 42. Non-permeate gas enriched in nitrogen is passed in line 43 to second stage membrane 44, from which product nitrogen is removed as non-permeate gas through line 45 containing valve 46. Permeate gas from second stage membrane 44 is recycled in line 47 for passage, together with additional quantities of feed air, in line 31 to feed air compressor 32. Pressure sensor 48 is used to determine the pressure of the feed air passing to first stage membrane 41, desirably downstream of heater 39, and to transmit a corresponding input signal 49 to process computer/controller 50. Temperature sensor 51 is used to determine the feed air temperature desirably at said point, and to transmit a corresponding input signal 52 to said process controller 50. Similarly, purity sensor 53 is positioned in product nitrogen line 45 downstream of second stage membrane 44 to determine the purity of the product in said line and to transmit a corresponding input signal 54 to said process controller 50. In addition, product flow sensor 55 is positioned in said product nitrogen line 45 to determine the product flow therein and to transmit a corresponding input signal 56 to said process controller 50. Other processing variables can likewise be determined, if so desired. Process controller 50 is adapted to receive said input signals and to produce corresponding output signal 57 to control the operation of air compressor 32 and output signals 58 and/or 59 to control the operation of aftercooler unit 34 and/or heater 39, respectively.

When the ambient temperature is low, the feed air pressure is adjusted to a predetermined maximum level, and the feed air temperature is adjusted to the predetermined optimum operating temperature level, 70° F. in the illustrative example above. When the ambient temperature rises during particular portions of the year, so that cooling by means of the aftercooler unit is insufficient to maintain the optimum operating temperature level, the feed temperature would rise in response to increases in ambient temperature. In the practice of the invention, the pressure is controlled, i.e., decreased, to a proper value as determined by the process controller, in response to input signals from the sensors, so as to maintain the product properties within the established specifications, i.e., for product purity and/or flow, or to otherwise maintain such properties to predetermined values depending on the feed air temperature.

FIG. 4 of the drawing illustrates the variation of feed temperature and pressure with ambient temperature for a particular membrane air separation T-Trak process for the production of 99% nitrogen product gas. Using the data from FIG. 2, the fraction of time spent in various temperature zones over the course of annual operation is shown for operations in Stuttgart, Germany. In the illustrative example of FIG. 4, 65% of the time the membrane air separation process is operated isothermally, with the second operating regime, in which reduced air feed pressures are employed, accounting for 35% of the time of operation. It will be appreciated that said time periods will vary for different plant-site locations. In the operation of the T-Trak process of the invention as illustrated by the FIG. 4 example, it will be seen that the pressure is caused to fall as the ambient temperature rises, with the membrane air separation plant conveniently maintaining a temperature of 15° F. above ambient temperature. Under such conditions, in which it is not feasible to maintain isothermal operation the optimum operating temperature of the membrane material, e.g., 70° F. in the illustrated example, the feed air pressure is decreased from the 190 psia level employed in operations at said optimum operating temperature so as to maintain the desired 99% product nitrogen production. The operating pressure is thus reduced to 150 psia under the condition in which the plant temperature, i.e., the feed air temperature to the membrane, reaches 110° F.

Figure 5:
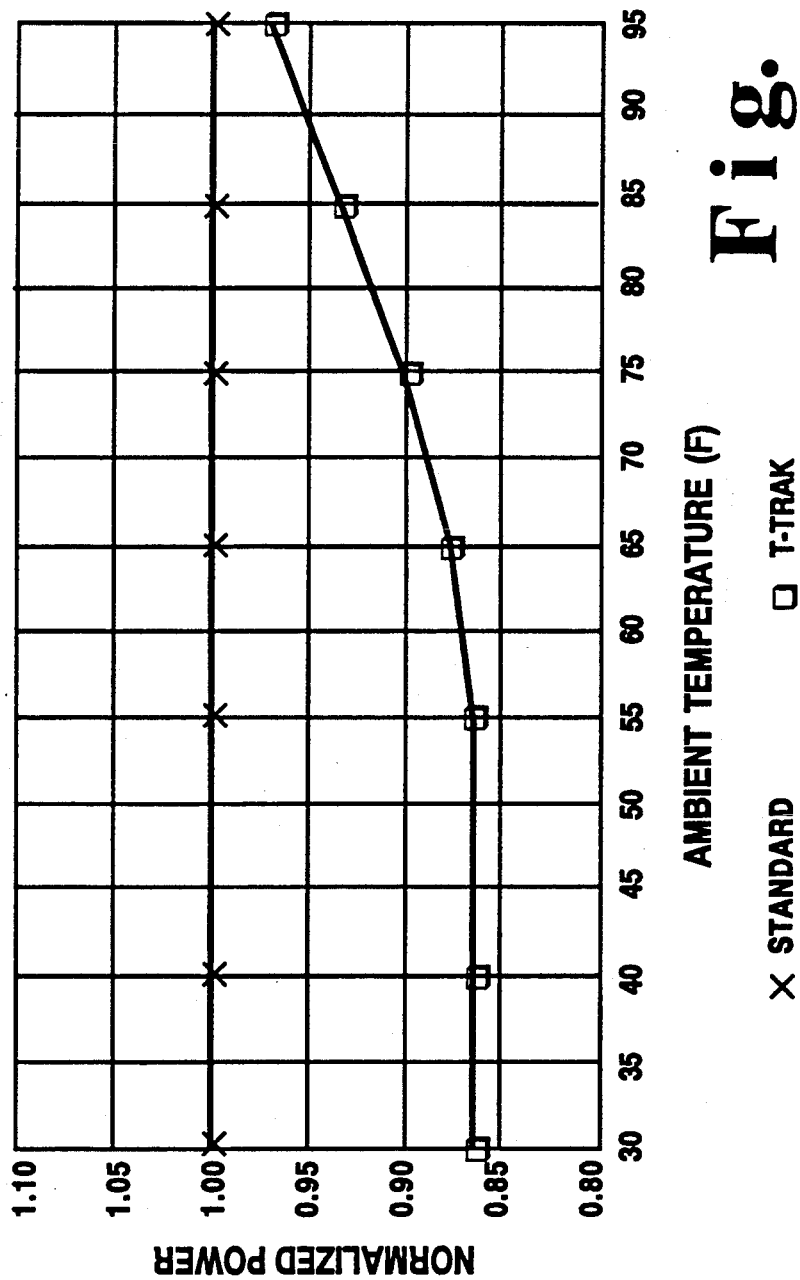
FIG. 5 is a plot of power factor vs. ambient temperature for constant temperature and pressure prior art processing and the temperature tracking process of the invention.

The T-Trak process of the invention has been compared with the standard process for the production of 99% nitrogen. The standard process operates isothermally at 105° F. and a pressure of 190 psia. This temperature is high enough to accommodate the highest ambient temperature (90° F.) for a conventional membrane encountered at the indicated Stuttgart, Germany location. The optimum operating temperature for the T-Trak process, as shown in FIG. 4, is about 70° F. for the advanced membrane material in question. The process Power Factor, normalized to the standard process, is plotted as a function of the temperature, as shown in FIG. 5. At low ambient temperatures, the power requirements for the T-Trak process are only 86% of the power required for the standard process. This reduction in power is due principally to the higher value of $\alpha$, i.e. selectivity, of the advanced membrane at the lower operating temperature used in the operation of the T-Trak process. Above an ambient temperature of 55° F., the power requirements of the T-Trak process increase, but remain less than those of the standard process, although approaching the requirements of the standard process at the highest ambient temperature conditions.

To illustrate the benefits of the T-Trak process, the Area Factors and the Power Factors have been determined for the standard process and for the invention as a function of product purity. For such purpose, the ambient temperature variation has been taken as that of Stuttgart, as represented by FIG. 2 of the drawings. The Power Factors were computed for each temperature zone, and the overall Power Factor for the process were taken as the mean zone values weighted by the percent of the year spent in each zone. The Area Factors and Power Factors were used in the plots of FIGS. 6 and 7.

Figure 6:
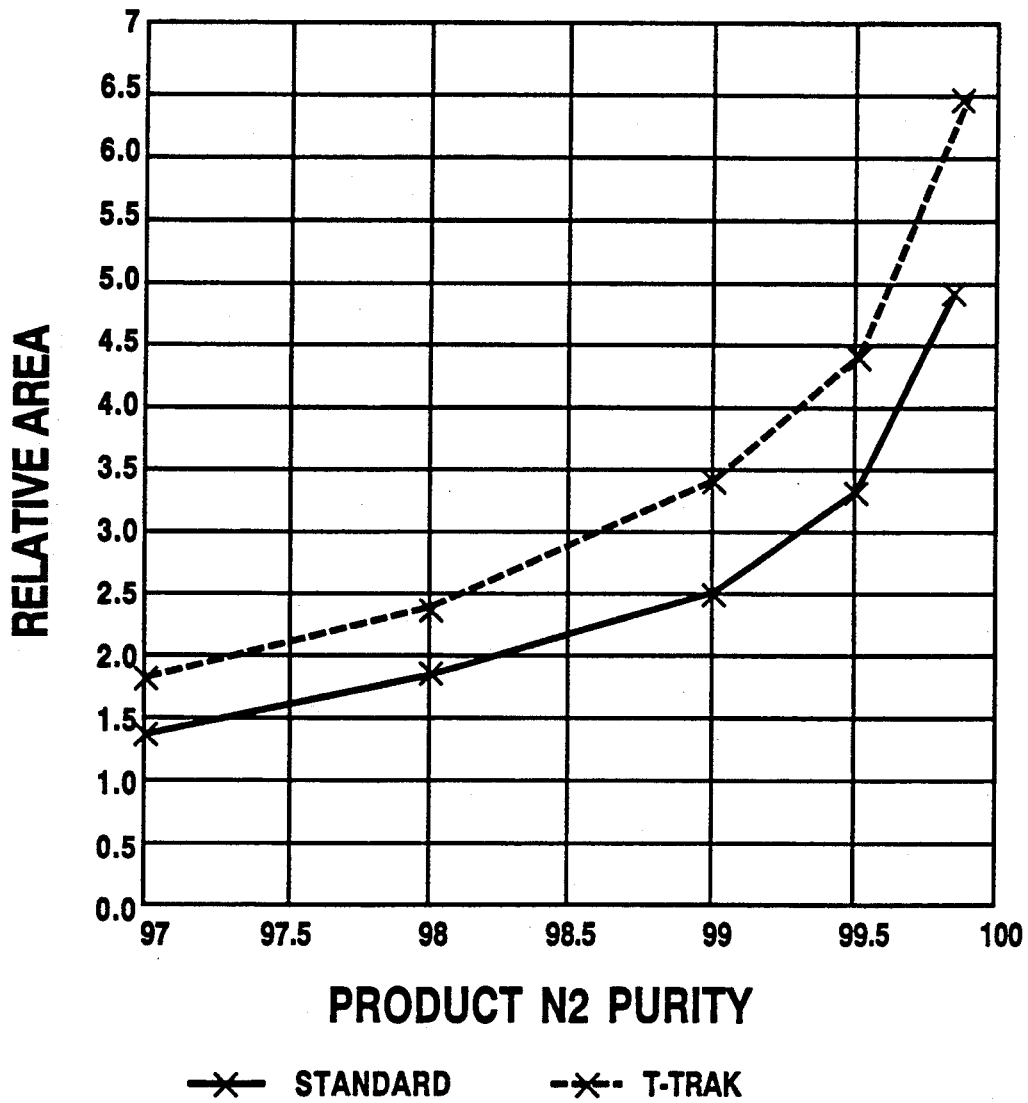
FIG. 6 is a plot of the area factor vs. purity for the constant temperature and pressure processing conditions of the prior art and the temperature tracking process of the invention as typically carried out at Stuttgart, Germany.

The mean relative Area Factors, for the T-Trak process of the invention and for the standard process are plotted against product purity in FIG. 6 of the drawings. This plot shows that the standard process has a lower mean Area Factor at all purity levels. This is due to the lower permeabilities at lower temperatures.

Figure 7:
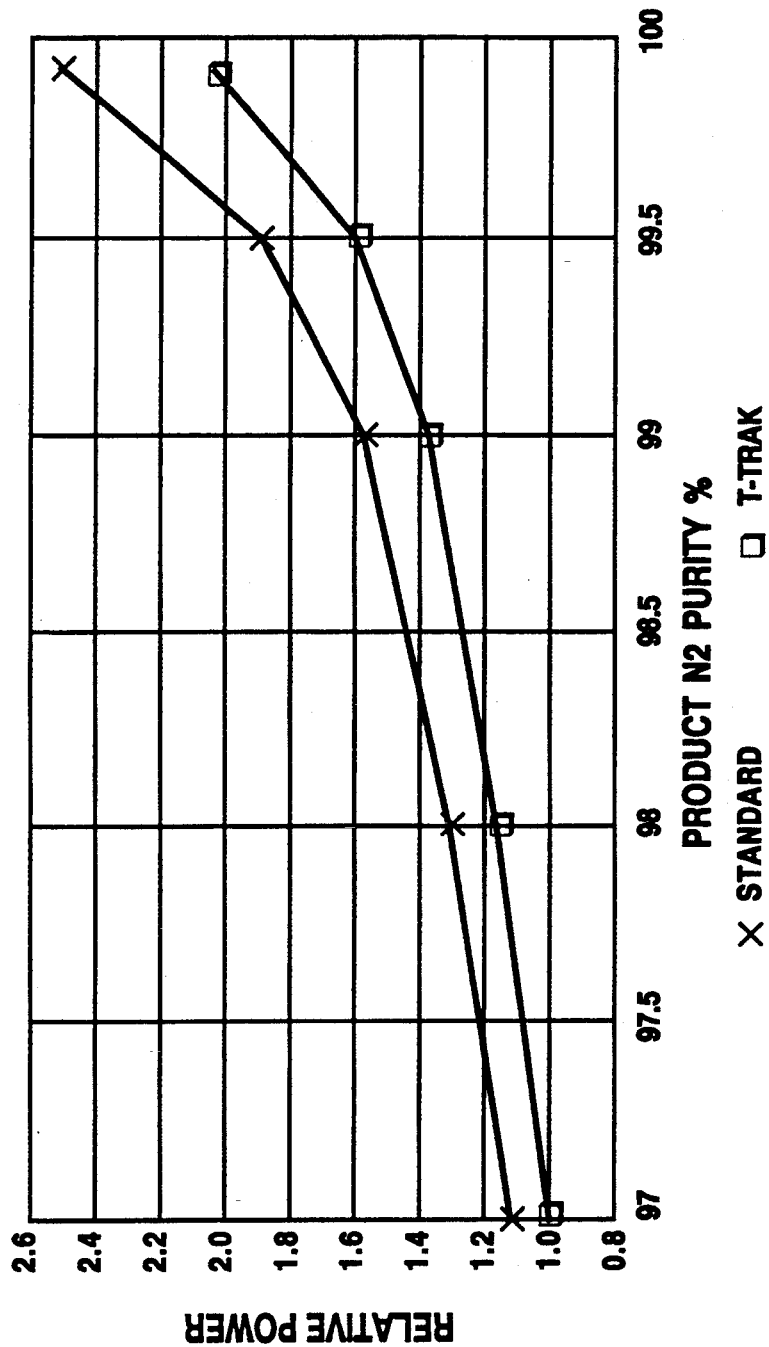
FIG. 7, is a plot of relative power vs. purity for the constant temperature and pressure processing of the prior art and the temperature tracking process of the invention at Stuttgart, Germany.

In FIG. 7, the mean relative Power Factors are plotted against product purity, This plot shows that the T-Trak process has a lower mean Power Factor for all purities. This is due to the higher selectivity $\alpha$ value at lower temperatures.

The cost of the membrane air separation process depends on both the Area Factor and the Power Factor. High values of these factors lead to high costs. The process cost also depends on the unit cost of the membrane material and on the capitalized cost of power. As indicated above, the Cost Function for the process is a weighted combination of the Area Factor and the Power Factor. For a relatively low capitalized cost of power, e.g. about $1,500/kw, the Cost Function can be, as indicated above, expressed as follows:

cost Function (U.S.)=5×Area Factor+1.5×Power Factor

In locations where the capitalized cost of power is higher, for instance about $2,500/kw, the Cost Function appropriate for such locations is:

cost Function=5×Area Factor+2.5×Power Factor

In relatively low power cost regions, the T-Track process is found to provide a small, steady and desirable cost benefit over the standard isothermal process. In relatively high power cost regions, the T-Trak process is found to have substantially lower costs than the standard isothermal process.

It will be seen from these illustrations that the extent of the advantages of the invention depend strongly upon the cost of power. In regions where power is relatively cheap, the advantage is measurable, but is not appreciable. In regions of such relatively high power cost locations, the T-Trak process offers a substantial cost advantage.

The examples of the invention herein provided are based on current membrane costs. As further progress is made in membrane manufacturing technology, the permeability of membranes will likely increase, and the unit cost of membrane surface area will likely decrease for current levels. Such developments will serve to necessarily change the coefficients in the cost equation referred to above, making the surface area less costly and placing more emphasis on power costs in the on-going efforts to reduce the cost of membrane operations and to enhance the feasibility of using membranes for a wide variety of important air separation applications. The advantages of the T-Trak process will then be larger and more significant.

In preferred embodiments of the invention, the compressor pressure is continuously decreased as the ambient temperature rises as described above. Some compressors, however, can be operated only over a limited range of pressure, and it may be impractical to continue to reduce the pressure beyond a certain minimum level for the particular compressor in question. If, in a particular application, the feed air pressure cannot be efficiently reduced beyond such a certain minimum level, an excess of product will be produced as a result of the built-in membrane surface area available in the membrane system. Since most commercial membrane plants contain many individual permeator modules, as indicated schematically in FIG. 8 of the drawings, it is possible to reduce the membrane surface area by isolating some of the modules in the overall membrane plant. When this is done, the feed air pressure may again have to be elevated, even though the compressor flow is reduced.

Figure 8:
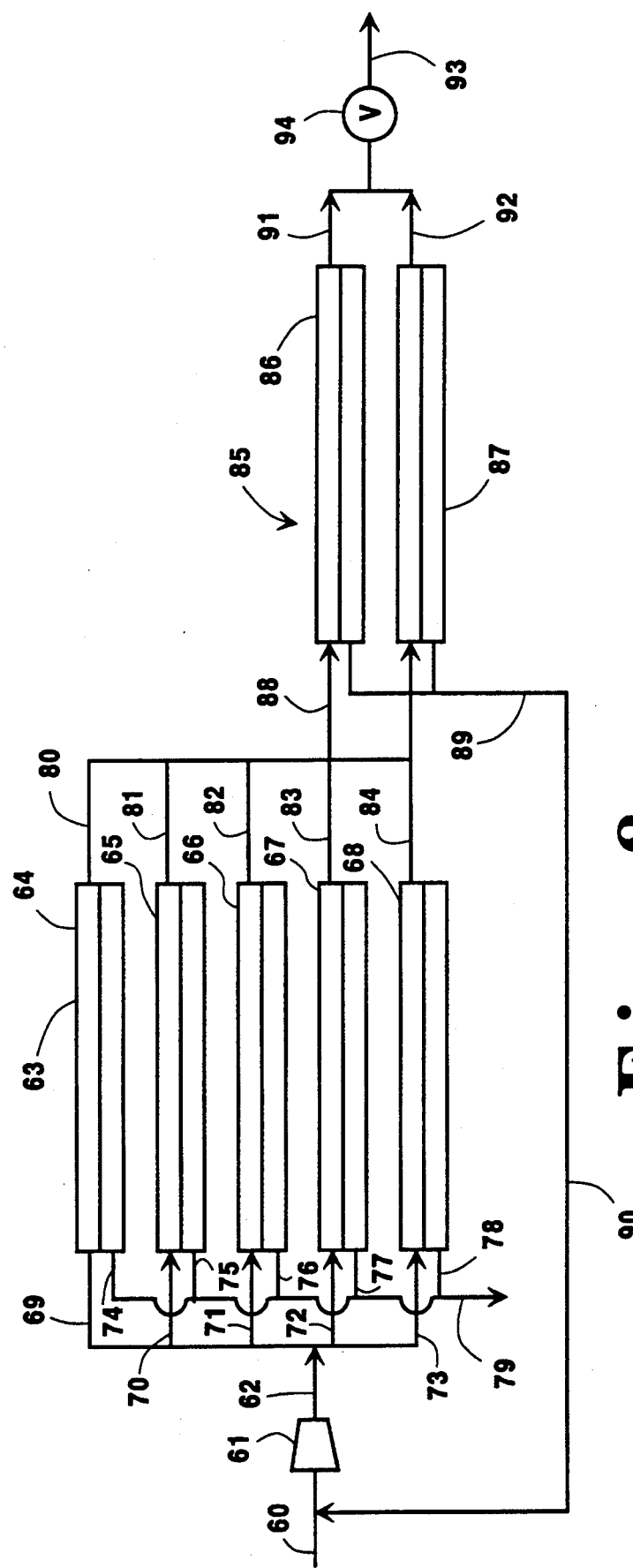
FIG. 8 is a schematic flow diagram illustrating a membrane system including a multiplicity of individual membrane modules.

In the illustrated embodiment of FIG. 8, feed line 60 passes to feed compressor 61 from which compressed feed air is passed in line 62 to first stage module unit 63, which is shown as comprising a multiplicity of individual modules, i.e., five individual modules 64, 65, 66, 67 and 68. Feed air is passed to each module in parallel through module inlet lines 69, 70, 71, 72 and 73, respectively. Permeate from such modules, i.e. the more selectively permeable oxygen component of feed air, is discharged from individual modules 64, 65, 66, 67 and 68, through outlet lines 74, 75, 76, 77 and 78, respectively, for discharge from first stage module unit 63 as a discharge stream in line 79. The less selectively permeable nitrogen component of feed air is passed from each of said individual modules in first stage module unit 63 through module outlet lines 80, 81, 82 83 and 84, respectively, for passage to second stage module unit 85, which is illustrated as containing two individual modules 86 and 87. Non-permeate gas from first stage module unit 63 is passed to said second stage module unit 85 through inlet line 88 to module 86 and/or through inlet line 89 to module 87. Permeate from the modules of second stage unit 85, containing a higher portion of nitrogen than the first stage permeate, is not generally discharged but is recycled in line 90 to feed line 60 for passage to feed compressor 61, and first stage module unit 63, with additional quantities of feed air. The less selectively permeable gas is removed from second stage modules 86 and 87 through outlet lines 91 and 92, respectively, for recovery as the desired product nitrogen gas in product line 93 containing outlet valve 94.

In the processing arrangement of FIG. 8, it will be seen that, if necessary, the flow of feed air to first stage module unit 63 and/or to second stage module unit 85 can be adjusted, as by suitable flow valve means, on the individual lines, so as to permit the flow of feed air to less than all five of the first stage modules, and/or to less than both of the second stage modules. In this manner, the membrane surface area being used can be conveniently reduced by thus isolating one or more of the individual modules from the operation of the overall system. In such cases, it is generally desirable to modify the pressure profile, conveniently by increasing the feed pressure from a lower minimum level for a particular compressor, e.g. from about 167 psia, to 190 psia, before then continuously reducing the compressor pressure back down to below about 170 psia, as illustrated in FIG. 9 of the drawing.

Figure 9:
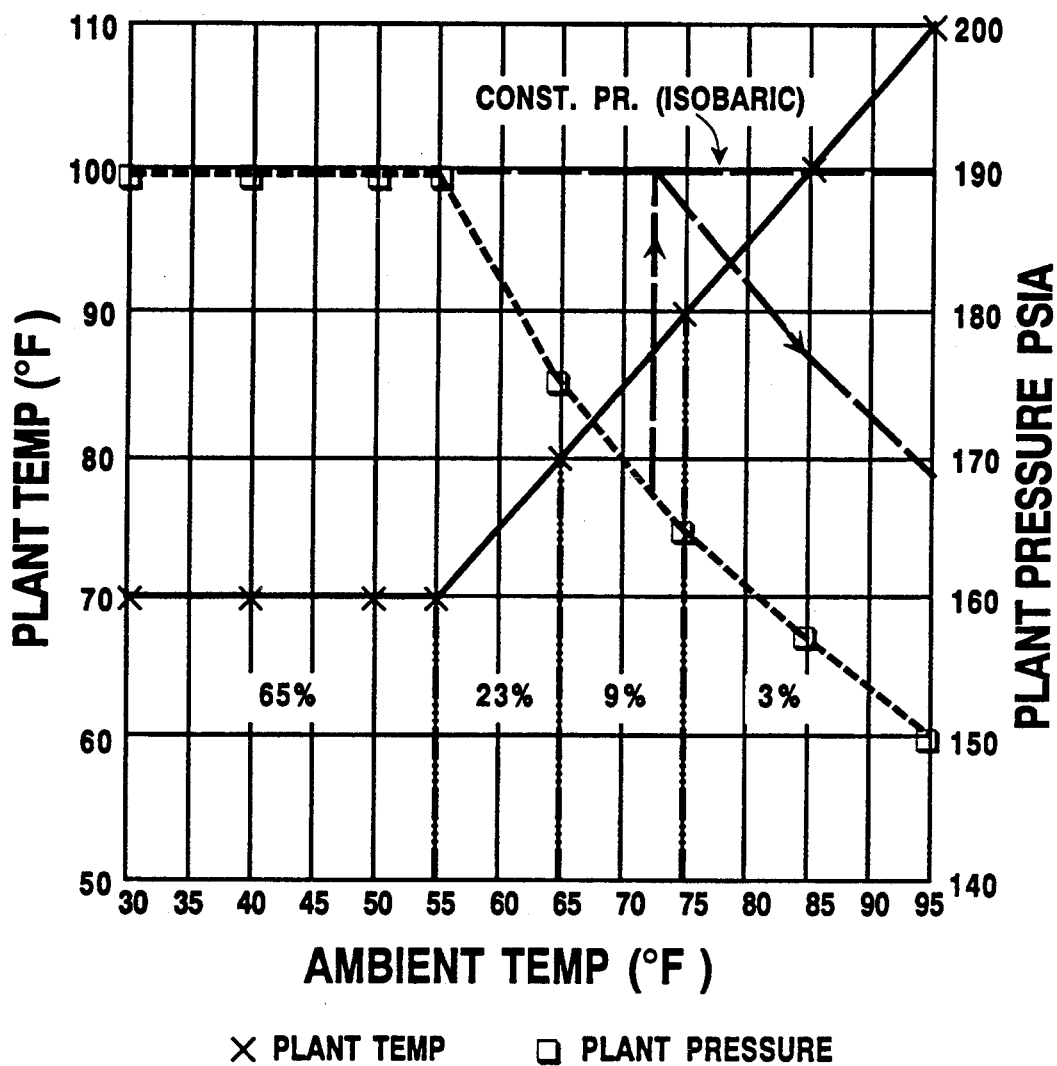
FIG. 9 is a plot of membrane temperature and pressure vs. ambient temperature for the temperature tracking process of the invention employed in the embodiment of FIG. 8 above.

It should be understood that the practice of the embodiment as illustrated in FIGS. 8 and 9 of the drawings is generally not as satisfactory as the preferred embodiment illustrated in FIGS. 3 and 4 of the drawings, due to the unused membrane surface area capacity of the isolated modules. Nevertheless, the embodiment of FIGS. 8 and 9 is still advantageous as compared to the standard process. Those skilled in the art will appreciate that the type of operation represented by said embodiment of FIGS. 8 and 9 may often be necessary for practical commercial application of the invention using the commercial compressor equipment that may be available at various job sites.

It will be understood that the alternative mode of operation, in which individual permeator modules are removed from service, i.e isolated from the flow of feed gas thereto, can be employed in embodiments in which the feed compressor is operated at one or more cycles of compressor pressure decrease in response to an increase in ambient temperature, with an increase in pressure intermediate and a reduction in active membrane surface area therebetween. While the FIG. 9 embodiment illustrates the elevation of the pressure back to the original pressure level of 190 psia from a low pressure of about 167 psia, it is also within the scope of the invention to increase the pressure to a different, typically lower upper pressure level, depending on the overall circumstances of a particular air separation operation. Thus, the conditions employed in operation of the alternative embodiment or of the preferred embodiment of the invention will depend on the volume and purity level of the desired product, the design and construction of the air separation membrane system employed, i.e. the membrane material employed, the number of membrane stages employed, the number and size of individual membrane modules employed, the feed compression equipment employed, and the operating capabilities thereof, and the like.

Those skilled in the art will appreciate that various changes can be made in the details of the invention, such as those referred to above, without departing from the scope of the invention as recited in the appended claims. Thus, the invention is not dependent on any particular membrane material being used in the membrane system, but rather is applicable in membrane operations in which any membrane material is employed having such high permeability characteristics that the desired optimum operating temperature therefor is above the ambient operating conditions under which the membrane system is to be operated during a portion of an operating year, and is below the ambient operating conditions during the remainder of the year. Representative examples of such high permeability membrane materials with respect to which the practice of the invention is advantageous are tetra bromo-bis-phenol type polyesters having $O_2/N_2$ selectivities (separation factors) of about 6.0–6.7 and $O_2$ permeabilities of about 5.7 to 9.0 Barrers at 25° C., polyamide, having an $O_2/N_2$ selectivly of about 3.9 and an $O_2$ permeability of about 83 Barrers at said 25° C., and other membrane materials, such as polyamide, polypyrrolone, 6 FDA-DAF (polyamide), 6 FDA-IPDA (polyamide), poly(phenylene oxide), poly(4-methyl-1-pentene), ethyl cellulose and silicone rubber. The permeability of the membrane material used in the practice of the invention for nitrogen production will generally be greater than 1 Barrer, preferably at least about 5 Barrers or above, at 100° F.

It should be noted that, while the invention has been described in particular with respect to air separation operations, it can be used to advantage in other significant gas separation operations as well. Thus, such gas separations as carbon dioxide/nitrogen, carbon dioxide/methane, hydrogen/nitrogen, hydrogen/methane and hydrogen/carbon dioxide can be advantageously carried out using the T-Trak process of the invention.

The invention provides a very significant advance in the membrane air separation art. By enabling advanced membrane materials, having high permeability characteristics and optimum operating temperatures significantly below ambient temperature over a portion of the operating year, to be operated under desirable operating temperature/reduced pressure ratio conditions through the use of the T-Trak process as herein described, the advantageous features of advanced membrane materials can be effectively utilized with appreciable savings in the power requirements of the membrane air separation operation. The invention is particularly beneficial in membrane plant locations having high power costs and relatively high ambient temperature conditions over a portion of an operating year.

I claim:

1. An improved gas separation process for the operation of high permeability membranes having optimum operating temperatures above cool ambient temperatures prevailing during a portion of an operating year at a gas separation location, the optimum operating temperature being below the ambient temperature during the remainder of the operating year, comprising the steps of:

(a) compressing feed gas to a predetermined feed gas operating pressure in a feed gas compressor of a feed gas compresser/membrane gas separation system combination at a plant location in which cool ambient temperature conditions prevail during a portion of the year, with higher ambient conditions prevailing during the remainder of the year, a design feed gas operating pressure being a desired feed gas pressure pertaining to said cool ambient temperature conditions;

(b) adjusting the feed gas at said predetermined feed gas operating pressure, using an aftercooler unit of the feed gas compressor and heater means to maintain a desired optimum operating temperature above said cool ambient temperature conditions during the portion of the year in which said cool ambient temperature conditions prevail;

(c) passing the feed gas, at said predetermined feed gas operating pressure and adjusted to a desired optimum operating temperature in step (b) above, to said membrane gas separation system for the isothermal separation of a less permeable component thereof at said desired optimum operating temperature, said membrane gas separation system being capable of selectively permeating the more permeable component of feed gas and comprising membrane separation material having a desired optimum operating temperature above said cool ambient temperature conditions;

(d) recovering non-permeate gas and permeate gas from the membrane gas separation system at said optimum operating temperature above said cool ambient temperature conditions;

(e) adjusting the thus compressed feed gas, using the aftercooler unit of the feed gas compressor and heater means, but allowing the operating temperature to rise in response to higher ambient temperature conditions in the portion of the year in which the ambient temperature rises to above the optimum operating temperature conditions prevailing during the other portion of the year;

(f) decreasing the feed gas operating pressure below said predetermined feed gas operating pressure that prevails at said cool ambient temperature conditions during the portion of the year in which the operating temperature is allowed to rise in step (e), in response to higher ambient temperature conditions, so as to maintain desired product conditions in step (d), whereby membrane gas separation operations are carried out for the production of product gas under varying ambient temperature conditions without the use of external refrigeration and at desirable reduced power consumption levels.

2. The process of claim 1 in which, during step (e), the operating temperature is allowed to rise approximately 5° F. to 15° F. higher than the prevailing ambient temperature.

3. The process of claim 1 in which, during step (f), the operating pressure is decreased in response to a rise in ambient temperature so as to maintain product purity and/or flow conditions essentially at purity and/or flow conditions prevailing under cool ambient temperature conditions.

4. The process of claim 1 in which said feed gas comprises air, and said membrane gas separation system comprises a membrane air separation system capable of selectively permeating oxygen as the more permeable component of feed air, with recovery of non-permeate nitrogen product gas.

5. The process of claim 4 in which said product gas is about 99% nitrogen.

6. The process of claim 4 in which said membrane air separation system comprises a two stage membrane system.

7. The process of claim 4 in which said membrane separation material has a permeability for oxygen of at least about 0.5 Barrers at 100° F.

8. The process of claim 4 in which said membrane air separation system comprises more than one individual membrane modules adapted for parallel flow therethrough.

9. The process of claim 8 in which said membrane air separation system contains a multiplicity of individual membrane modules.

10. The process of claim 8 in which, in step (f), the feed air operating pressure is decreased to not more than a predetermined lower operating pressure level for said feed air compressor, and including isolating at least one of said individual membrane modules from the flow of feed air to the membrane air separation system, in response to the rise in operating temperature at said higher ambient temperature conditions.

11. The process of claim 10 in which, during step (e), the operating temperature is allowed to rise approximately 5° F. to 15° F. higher than the prevailing ambient temperature.

12. The process of claim 10 and including increasing the feed air operating pressure in conjunction with the isolating of at least one individual membrane module prior to further decreasing of said feed air operating pressure in step (f).

13. The process of claim 12 in which said feed air operating pressure is increased to the predetermined feed air operating pressure of step (a).

14. The process of claim 1 and including: (i) monitoring the quantity and/or purity of the product gas recovered, and the temperature and/or pressure of the compressed feed gas passing to the membrane gas separation system; (ii) sending process variable signals proportional to the process conditions monitored in (i) above to a process computer/controller system adapted to send corresponding output signals to the feed gas compressor and/or the aftercooler unit thereof, and/or said heater means, for control of feed gas compression and/or adjustment in steps (a) and (b) in response to changes in said ambient temperature conditions.

15. The process of claim 14, in which said feed gas comprises air, and said membrane gas separation system comprises a membrane air separation system capable of selectively permeating oxygen as the more permeable component of feed air, with recovery of non-permeate nitrogen product gas.

16. The process of cliam 1 in which the cool ambient temperature conditions below the optimum operating temperature prevail at least about ½ of an operating year, the ambient temperature rising to above said optimum operating temperature during the remainder of the operating year.

17. The process of claim 1 and including removing condensate from the feed gas passing from the aftercooler unit of the feed gas compressor, the compressed feed gas passing from the heater means comprising superheated gas, thereby preventing undesired condensation in the membrane gas separation system.

18. The process of claim 17 in which said feed gas comprises air, and said membrane gas separation system comprises a membrane air separation system capable of selectively permeating oxygen as the more permeable component of feed air, with recovery of the non-permeate nitrogen product.

19. The process of claim 1 in which the surface area of the membrane gas separation system is maintained constant during steps (c)–(f).

20. The process of claim 1 in which said feed gas comprises air.

* * * * *